US012339978B2

(12) United States Patent
Sood et al.

(10) Patent No.: US 12,339,978 B2
(45) Date of Patent: Jun. 24, 2025

(54) NETWORK INTERFACE WITH DATA PROTECTION

(71) Applicant: Intel Corporation, Santa Clara, CA (US)

(72) Inventors: Kapil Sood, Portland, OR (US); Patrick Connor, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 910 days.

(21) Appl. No.: 17/165,769

(22) Filed: Feb. 2, 2021

(65) Prior Publication Data

US 2021/0157935 A1   May 27, 2021

(51) Int. Cl.
G06F 21/60 (2013.01)
G06F 12/1009 (2016.01)
G06F 12/14 (2006.01)
G06F 21/53 (2013.01)
G06F 21/71 (2013.01)

(52) U.S. Cl.
CPC ........ G06F 21/606 (2013.01); G06F 12/1009 (2013.01); G06F 12/1408 (2013.01); G06F 21/53 (2013.01); G06F 21/602 (2013.01); G06F 21/71 (2013.01)

(58) Field of Classification Search
CPC .. G06F 21/602; G06F 21/606; G06F 12/1009; G06F 12/1408; G06F 21/53; G06F 21/71; H04L 9/0894; H04L 9/0897
See application file for complete search history.

(56) References Cited

U.S. PATENT DOCUMENTS

| 9,419,954 | B1* | 8/2016 | Riera ................ H04W 12/068 |
| 9,661,007 | B2* | 5/2017 | Gasparakis ............ G06F 21/60 |
| 2003/0135757 | A1 | 7/2003 | Connor et al. |
| 2005/0076228 | A1* | 4/2005 | Davis .................... G06F 21/73 713/188 |
| 2006/0184785 | A1* | 8/2006 | Challener ............ G06F 21/606 713/151 |
| 2015/0363332 | A1* | 12/2015 | Mundra ................ G06F 21/79 713/193 |
| 2016/0043996 | A1* | 2/2016 | Syed Mohamed ..... H04L 63/04 726/1 |
| 2016/0321083 | A1* | 11/2016 | Costa ................. G06F 12/0284 |
| 2017/0063808 | A1* | 3/2017 | Manapragada ..... H04L 63/0272 |
| 2018/0159880 | A1* | 6/2018 | Sood ...................... H04L 63/18 |
| 2018/0357093 | A1* | 12/2018 | Cong ................... G06F 12/109 |
| 2019/0052457 | A1 | 2/2019 | Connor et al. |
| 2019/0220601 | A1* | 7/2019 | Sood ...................... G06F 9/505 |
| 2019/0281025 | A1 | 9/2019 | Harriman et al. |
| 2020/0127981 | A1* | 4/2020 | Yang ................... H04L 63/068 |

(Continued)

OTHER PUBLICATIONS

Intel, "Intel Trust Domain CPU Architectural Extensions", Revision 343754-001, Sep. 2020, 40 pages.

(Continued)

Primary Examiner — Shanto Abedin
(74) Attorney, Agent, or Firm — Compass IP Law PC

(57) ABSTRACT

A network interface controller (NIC) to interact with virtual environments when they are within a trusted environment protected by a cryptography scheme. The NIC performs encryption of data in accordance with the cryptographic scheme of a target trusted environment prior to copying the data for access by the target trusted environment.

15 Claims, 6 Drawing Sheets

(56) References Cited

U.S. PATENT DOCUMENTS

| | | |
|---|---|---|
| 2020/0151362 A1 | 5/2020 | Harriman et al. |
| 2021/0173794 A1* | 6/2021 | Koufaty .............. G06F 12/1009 |
| 2022/0067221 A1* | 3/2022 | Schiattarella ........... H04L 9/088 |
| 2022/0164451 A1* | 5/2022 | Bagwell .............. H04L 63/0428 |
| 2022/0188146 A1* | 6/2022 | Li ....................... H04L 63/0428 |

OTHER PUBLICATIONS

Intel, "Intel Trust Domain Extensions", White Paper, 9 pages.
Khan, Rashid, "Pushing the Limits of Kernel Networking", Red Hat Blog, https://www.redhat.com/en/blog/pushing-limits-kernel-networking, Sep. 29, 2015, 13 pages.

* cited by examiner

NETWORK INTERFACE WITH DATA PROTECTION

BACKGROUND

In multi-tenant datacenter environments, multiple tenants (or customers) may share physical resources provided by servers through virtual environments (VE), (e.g., virtual machines (VMs) or containers). Shared resources may include computation resources, memory resources, cache, storage, fabric, input/output (I/O) resources, accelerators, and more. The servers may be composable (e.g., "disaggregated") and include both physical and virtual resources.

To maintain security of these shared resources, trusted environments (TE) are frequently created. These TEs may be referred to as trust domains, trust zones, secure enclaves, trusted execution environments, or similar. TEs are usually defined by an encryption key (or set of keys), the associated VE(s), and the resources assigned to the VE(s). Keys are used by agents of the TE to access data or other resources.

DETAILED DESCRIPTION

Data on a network can be encrypted for security. Computer systems also encrypt data in memory and in processors. However, the type of encryption used on a network is often different from the type of encryption used in a computer. As an example, to send data onto a network, the computer encryption of data would be removed and the data sent to a network controller where the network controller would apply network encryption and then send the encrypted data in packets onto the network. This example illustrates a security gap where the data has neither encryption type as it is sent to the network controller. For example, communications with the network controller may be in "plaintext"—potentially accessible by malicious tenants or other attackers. As described below, security issues posed by communication to a network controller can be reduced by having the network controller handle secure communication with trusted environments in addition to traditional network security.

In greater detail, datacenters can have multiple tenants (e.g., users, clients, customers). Due to security considerations, data protection schemes are often needed to ensure that each tenant's data cannot be accessed by other tenants. This is a challenge for datacenters that have many tenants, running many applications, utilizing shared services, resources, and infrastructure. For example, cloud service providers (CSPs) provide infrastructure as a service (IaaS) and platform as a service (PaaS) under which virtual compute resources are composed from physical hardware. This often results in software from multiple tenants often running on the same physical resource(s). Another example is communications service providers (CoSPs) where tenants may run virtualized network functions (VNF) or other shared services. A VNF (e.g., cloud native microservices firewall) may have functionality split across resources such as processors and NICs.

Figure 1:
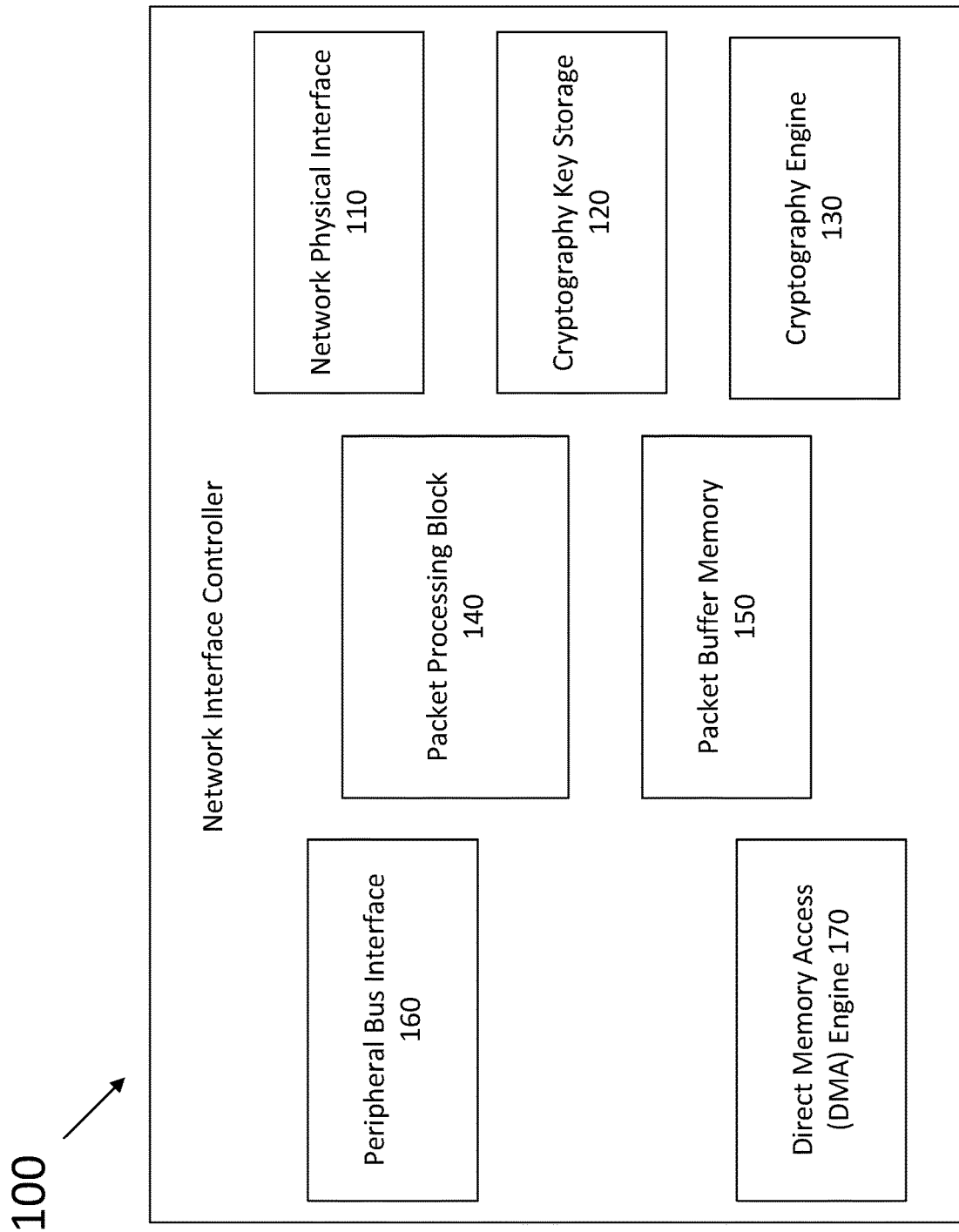
FIG. 1 is a diagram illustrating a network interface controller (NIC).

FIG. 1 shows an example of a network interface controller (NIC) (e.g., SmartNIC, infrastructure processing unit (IPU), data processing unit (DPU)) that can enhance security in a multi-tenant environment. The NIC 100 has a circuitry to interface to the media of a network, e.g., network physical interface 110. The NIC 100 has a cryptography engine 130 to encrypt and decrypt packet data and related data for transactions on the network and peripheral bus. The cryptography engine 130 may be a collection of one or more cryptographic engines. For example, cryptographic operations for peripheral bus 270 may be a separate cryptographic engine from the cryptographic engine used for network traffic cryptographic operations. In another example, ingress traffic may be handled by one cryptographic engine and egress traffic by another. In a third example, traffic from specific VEs may be physically isolated from traffic associated with other VEs by use of independent cryptographic engines. The cryptography engine 130 utilizes a cryptography key storage 120. Cryptography key storage 120 can hold one or more keys that cryptography engine 130 uses. The cryptography key storage 120 may be a subset of keys available to NIC 100. Additional keys may be stored in a key storage database. Additional keys may further be generated via a key management server or via key services of processor 210. Keys can, for example, be generated through the use of a cryptographically secure random bit generator. Respective keys in the cryptography key storage 120 are associated with a specific TE, peripheral bus, and/or network flow.

The NIC 100 includes a packet processing block 140, for example, to verify a packet's integrity, filter packets, perform offload operations, transform (e.g., network address translation, encapsulate, decapsulate), and/or coalesce packets. This packet processing block 140 can comprise ternary content-addressable memory (TCAM), programmable packet processing pipeline(s), FPGA(s), ASIC(s), and/or programmable processing unit(s). Packet buffer memory 150 is used to store packets as they move throughout NIC 100 for processing by various subcomponents. This packet buffer memory 150 may be physically or logically segmented such as into ingress and egress portions. Packet buffer memory 150 may be shared or partitioned to various VEs based on priority, class-of-service (CoS), quality-of-service (QoS), service-level agreement (SLA), in-band network telemetry (INT), or similar. Packet buffer memory 150 may be implemented as a buffer or a queue, such as a circular first-in, first-out (FIFO) buffer. Peripheral bus interface 160 is used for transactions to and from the host system. These transactions include interrupts, direct memory access (DMA) transfers, and/or data streaming (DSA). Peripheral bus interface 160 can be used for transfer of different data types such as telemetry, statistics, control, and status. Though a sample NIC 100 architecture is shown, many NICs vary in their architecture and features.

Figure 2:
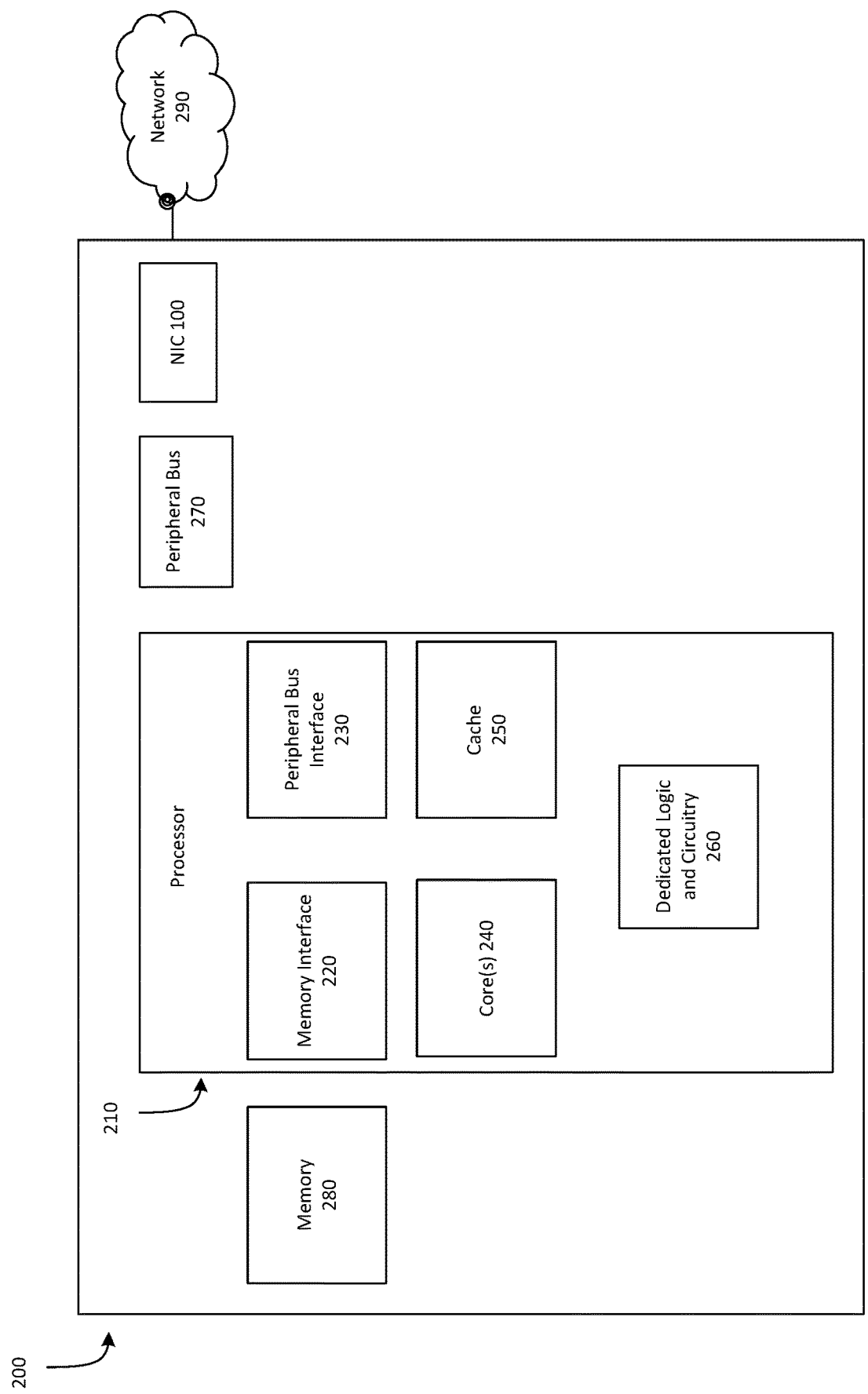
FIG. 2 is a diagram illustrating a server.

FIG. 2 is a diagram illustrating an example of a server 200 containing a NIC (e.g., NIC 100 of FIG. 1). Server 200 may be a server, blade server, server module, a composable server, etc. Server 200 may comprise a compute node, storage node, or another specific node type (e.g., an accelerator). NIC 100 is to attach to Network 290. Network 290 is a communications network such as a local area network (LAN), datacenter network, metropolitan area network (MAN), or wide area network (WAN); it may be wired or wireless, it may utilize copper or fiber optic media, it maybe Ethernet, Token Ring, Fiber Distributed Data Interface (FDDI), Attached Resource Computer Network (ARCNet), Asynchronous Transfer Mode (ATM), or similar. NIC 100 of FIG. 2 attaches to the server via Peripheral Bus 270.

Peripheral Bus 270 may be Peripheral Component Interconnect express (PCIe), Computer Express Link (CXL), InfiniBand, Omni-Path, Cache Coherent Interconnect for Accelerators (CCIX), Gen-Z interconnect, HyperTransport, Infinity fabric, Coherent AMD socKet Extender (CAKE), Open Coherent Accelerator Processor Interface (OpenCAPI), or similar. These interconnect technologies may apply an encryption method to data that they transport or convey. Operations across a peripheral bus 270 may include an indication in a Guest Physical Address (GPA) that allows the device to access encrypted memory. NIC 100 can comprise a discrete chip, a local area network (LAN) on motherboard (LOM) design, a chipset, an SoC design, as part of a network switch (e.g., top of rack (TOR), leaf switch), on a peripheral add-in board, etc.

In the case of SoC designs, peripheral bus 270 may be Intel On-Chip System Fabric (IOSF), Advanced Microcontroller Bus Architecture (AMBA), or similar. In chiplet designs, Peripheral Bus 270 may be a chip to chip interconnect such as Advanced Interface Bus (AIB), Kandou Bus interface (KBI), or similar. Processor 210 may be a central processing unit (CPU), a microengine, a microcontroller, a GPU, a DPU, or an XPU. There may be one or more processor 210 units in server 200. Processor 210 comprises processing core(s) 240. Processing core(s) 240 can execute instructions of and support virtual environment(s), operating system(s), application(s), and TE(s). Memory 280 is attached to processor 210. The portion(s) of memory 280 associated with one or more TEs are generally encrypted.

Processor 210 may employ architectures including but not limited to ARM®-based architecture, GPU microarchitectures, reduced instruction set computing (RISC) architecture, or Intel® architecture (IA) (e.g., Intel® x86 compatible architectures, IA-32 architecture, or IA-64 architecture). Processor 210 employs a physical-address-metadata table (PAMT) associated with page allocation tracking, page initialization, and translation lookaside buffer (TLB) consistency, including for memory allocated to NIC 100 and the VE(s) with which NIC 100 interacts.

Figure 3A:
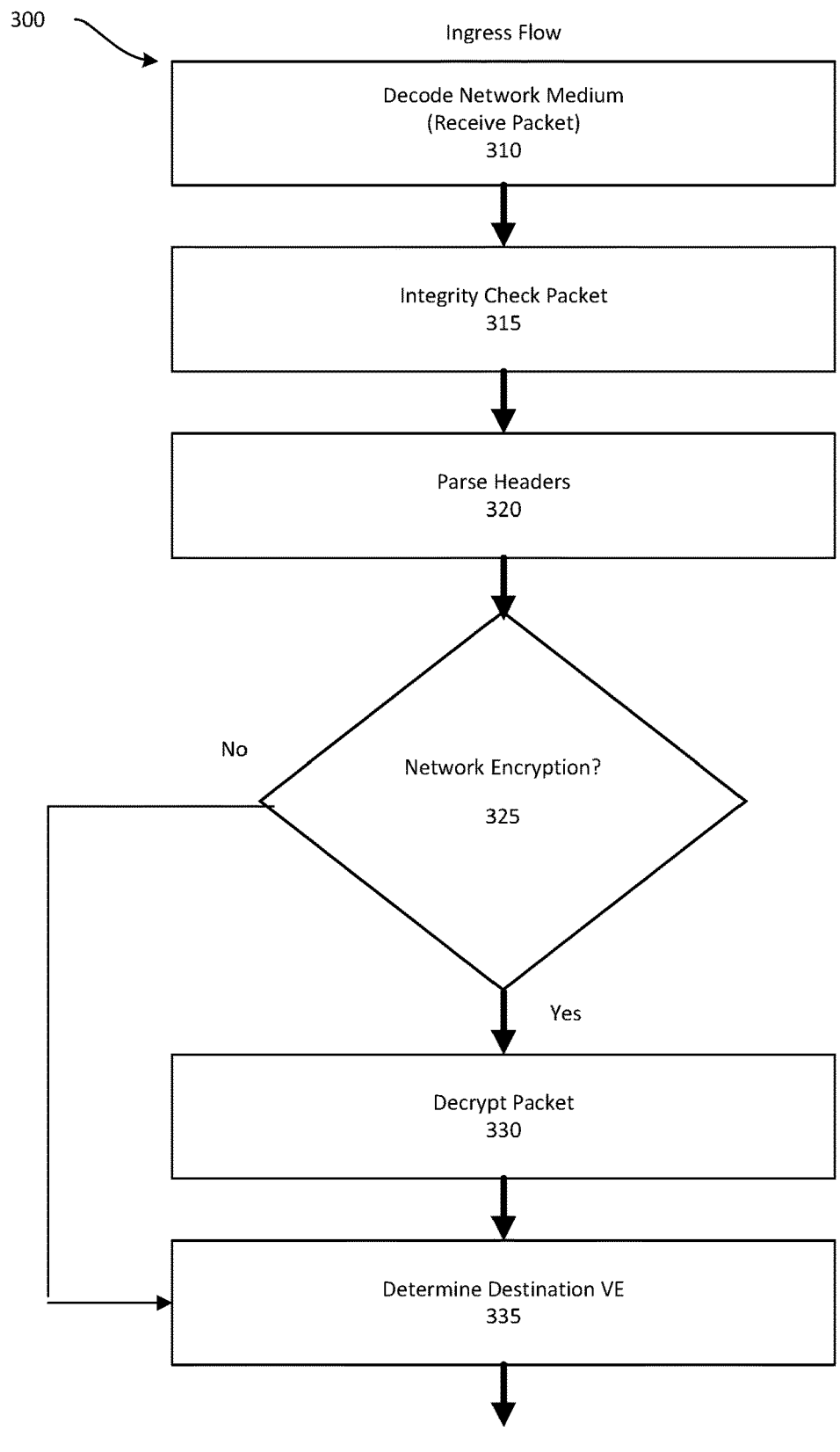
FIGS. 3A-3B are diagrams illustrating an ingress flow.
Figure 3B:
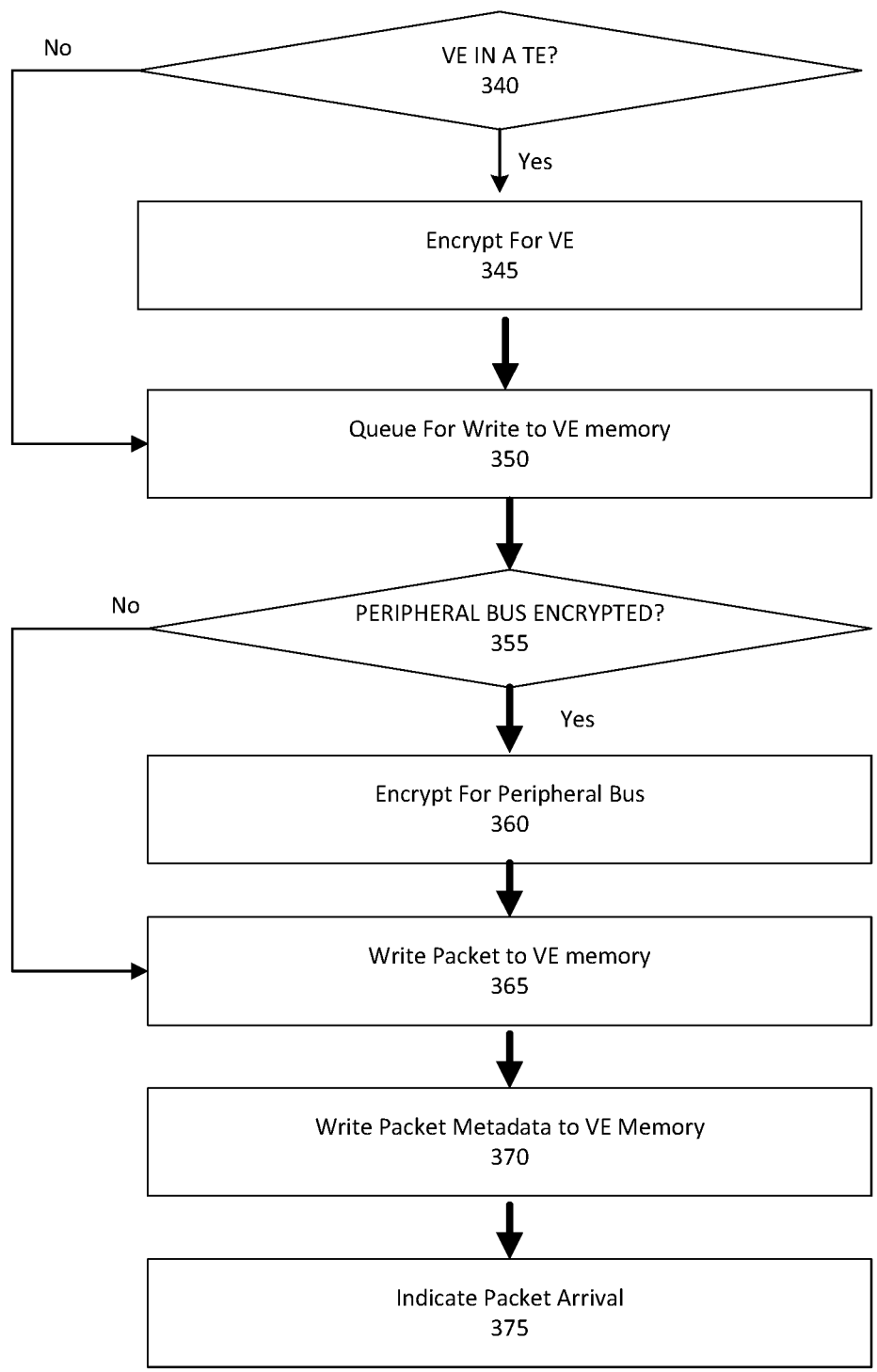

FIGS. 3A and 3B show an example illustrating an ingress flow 300 that can improve the security of host communication with a NIC 100. Referring to FIG. 3A, in 310, a packet is received by NIC 100 from the network media. In 315, the NIC 100 checks the integrity of the packet (e.g., determining if the cyclic redundancy check (CRC) is valid, determining if the length is valid). In 320, the headers of the packet are parsed. This portion may additionally filter out (e.g., drop) packets that do not pass address filtering. In 325, the NIC 100 determines if the packet has a type of network encryption which it can decrypt. This determination is made by examination of the packet's headers (e.g., an n-tuple—such as the source and destination addresses and source and destination ports of a packet) and the encryption keys available to NIC 100. In 330, the packet is decrypted if the required key(s) are available to NIC 100. In 335, NIC 100 determines which VE is to receive the packet. This determination is made, at least in part, from properties of the headers of the packet such as the destination address. The destination VE may be designated by the selection of the queue the packet is placed into for transfer into system memory 280. The destination VE may further, or alternatively, be designated by single-root input/output virtualization (SR-IOV) or scalable input/output virtualization (SIOV) resource selection.

Referring to FIG. 3B, in 340, the NIC 100 determines if the destination VE is part of a TE. This determination is made by one of several methods. NIC 100 may have authenticated, registered, or attested for the destination TE. The cryptography key for the destination TE may be available to NIC 100 either in key storage 120 or in an auxiliary key storage. NIC 100 may have a table that determines which VEs require encryption and the associated keys for this action. The device driver for NIC 100 may populate this table, or the processor 210 may have dedicated hardware cryptographic key features that inform NIC 100 for which VEs it encrypts. In 345, if the packet is to be encrypted and the required key(s) are available, the packet is encrypted as specified for the destination TE. This encryption operation can prevent plaintext being transmitted to memory 280 (such as via peripheral bus 270). In 350 the packet data is queued to be written to the portion of memory 280 associated with the destination VE. In 355, NIC 100 determines if the peripheral bus 270 requires encryption. This encryption may be different and in addition to the encryption required by the destination TE. Peripheral bus 270 may be a shared resource and adding an additional layer of encryption or multi-key encryption further increases security. If peripheral bus 270 requires encryption and the required key(s) are available to NIC 100, the packet is encrypted for transfer across peripheral bus 270 in block 360. In 365 the packet is written (e.g., DMA transferred) to the memory associated with the destination VE. Data direct I/O (DDIO) type functionality (e.g., DDIO, Compute Express Link (CXL) dot cache (CXL.cache)) may also store some of all of the packet into cache 250 during this transfer operation. In 370 metadata associated with the packet (e.g., packet descriptor(s)) is written to inform the VE of the properties of the packet (e.g., length, offloads performed, encryption state). In 375, the NIC 100 indicates the arrival of an ingress packet (and associated metadata) (e.g., by asserting an interrupt) to the VE. Alternatively, a receiving agent (e.g., network stack, device driver, operating system) may detect the arrival of the ingress packet via polling or other detection method.

Figure 4A:
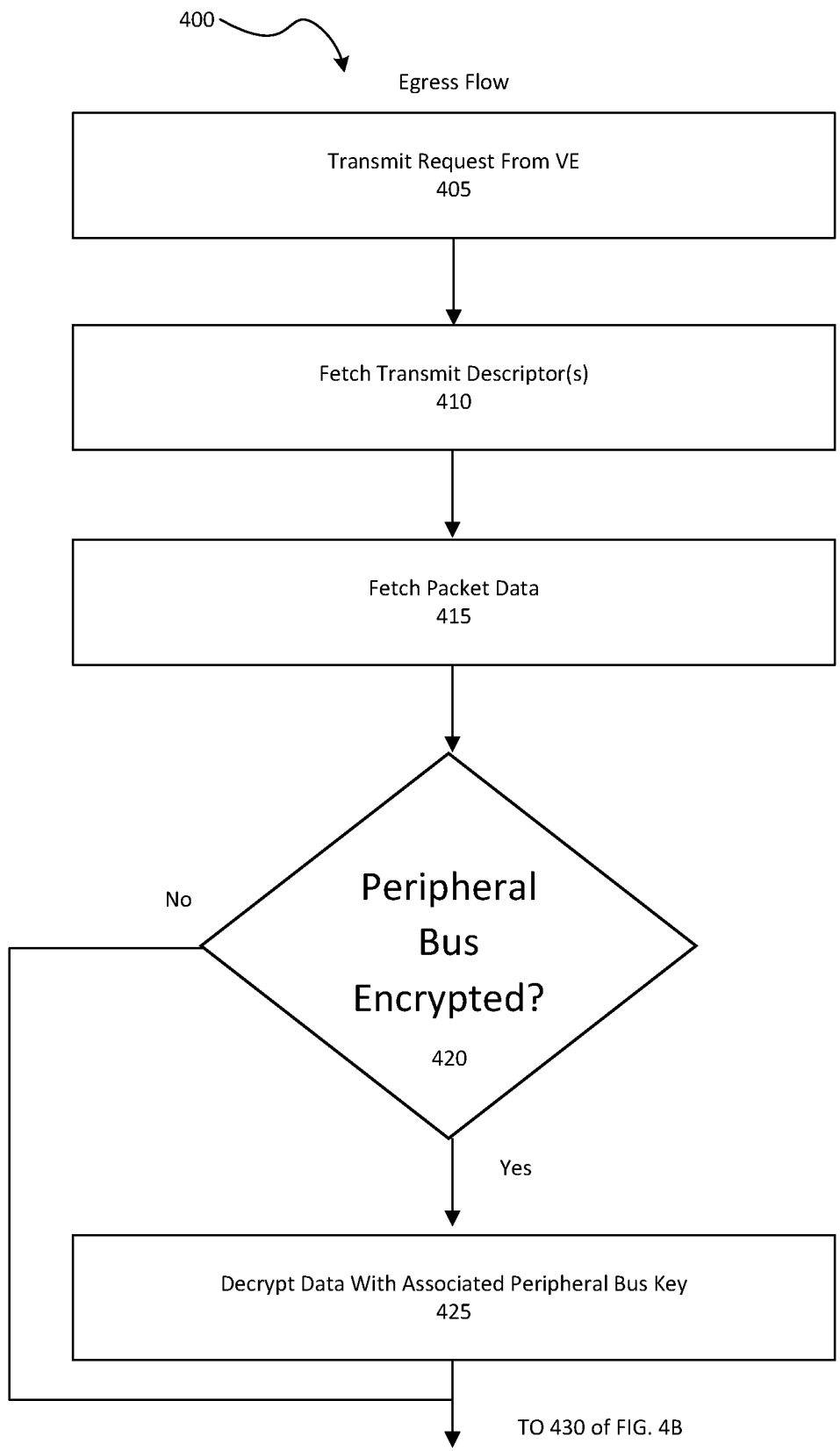
FIGS. 4A-4B are diagrams illustrating an egress flow.
Figure 4B:
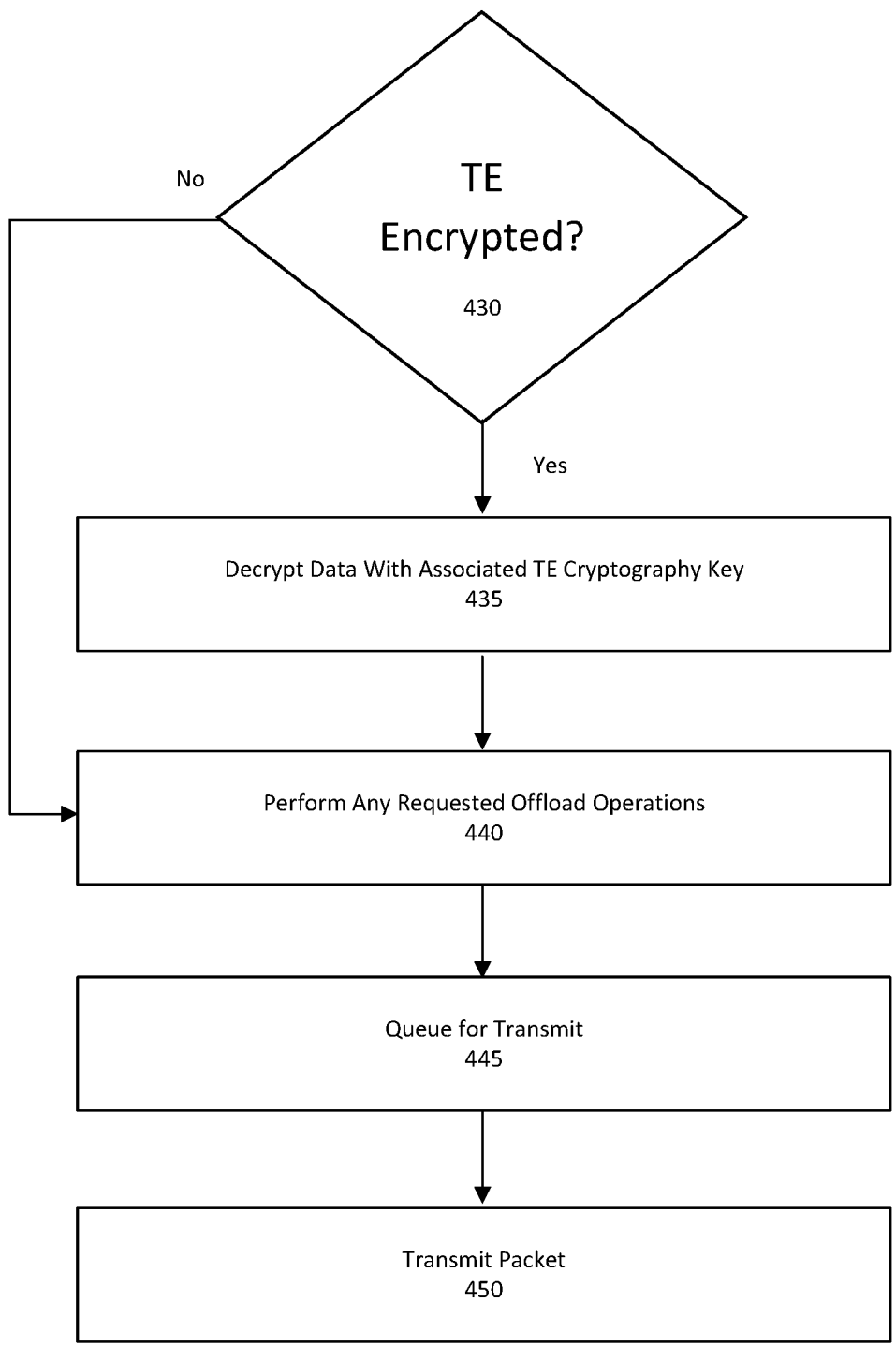

FIGS. 4A and 4B are diagrams illustrating an example of packet egress. Referring to FIG. 4A, in 405, NIC 100 (or a virtual NIC associated with NIC 100) receives a transmit request from a VE that is within a TE with which (at least a portion of) NIC 100 is associated (e.g., authenticated, attested, registered). In 410, NIC 100 fetches packet metadata that describes the packet location(s) in memory 280, the length of each portion of the packet, and the operations that NIC 100 is expected to perform on the packet before transmitting it onto network 290. In 415, NIC 100 reads the packet data. This may entail reading from multiple locations (e.g., addresses) in memory 280 (this is sometimes referred to as a 'gather' operation). For each read operation, NIC 100 indicates to memory 280 whether or not it is a member of the TE (e.g., the NIC 100 can access the key(s) associated with the TE) and whether the packet data should be encrypted or plaintext. In 420, NIC 100 determines if the read operation additionally utilized encryption for peripheral bus 270. If so, the data from peripheral bus 270 is decrypted in 425. Referring to FIG. 4B, in 430, NIC 100 determines if the data from the read operation is encrypted according to a TE encryption scheme or not. If the data from the read operation is encrypted and the required key(s) are available, then the data (e.g., portion or complete packet) is decrypted in 435. In 440, NIC 100 performs any operations that were requested in packet metadata from 410. This can include NIC 100 encrypting the packet with a network cryptography scheme. In 445, the packet is queued for transmission onto network 290. The queue selection can be based upon on priority, COS, QOS, SLA, INT, packet pacing, traffic shaping, or similar. In 450 the packet is transmitted onto network 290.

To illustrate, the following describes a sample ingress flow. Initially, NIC 100 receives a packet. The Network Physical Interface 110 (e.g., physical layer component) decodes the signals from the physical media and a digital representation of the packet (e.g., a packet) is created. Address checking, integrity checking, error detection, and other filtering are applied to ensure that the packet passes basic validity checks. If the packet has network security encryption (e.g., IP security (IPsec), Media Access Control Security (MACsec), Secure Sockets Layer (SSL), Transport Layer Security (TLS), Hypertext Transfer Protocol Secure (HTTPS)), the associated security key(s) are fetched or requested by NIC 100 and optionally stored in cryptography key storage 120. The packet is decrypted as pre-negotiated with the operating system. Next, the decrypted packet is parsed and the destination VE, queue, priority, and destination memory address to which the packet will be directed are determined. Next, NIC 100 performs offloads (e.g., checksum offload, receive side coalescing, receive side scaling). This may include processing by a programmable pipeline.

If the destination memory address for the packet is part of a TE such as Multi-key, total-memory-encryption (MKTME), then the NIC applies the TE encryption scheme, such as AES-128-XTS, to the packet data prior to writing the packet data to the destination memory 280. In some bus or fabric architectures, a write operation may be a split transaction where the destination retrieves the data via a read operation, rather than a write operation by the initiator. In some scenarios, NIC 100 additionally encrypts the packet data with the peripheral bus 270 encryption scheme as well as the TE encryption scheme.

Since NIC 100 is an authenticated member of the TE, the controller for memory 280 need not apply cryptography operations that would be necessary for plaintext data such as data from a NIC that was not a member of the TE. The packet data may still be inspected to ensure the TE encryption was properly applied. Exception paths would be initiated if unencrypted or improperly encrypted data from NIC 100 is detected.

On egress, for example, a virtual NIC of NIC 100, supporting a VE within a TE, receives a transmit request. NIC 100 fetches/reads the associated transmit descriptors. The read operation may include the use of encryption key(s) for peripheral bus 270. The read operation may further indicate that it is by a device within a specific TE indicating that TE encryption is to be maintained. Upon reading the descriptors, the NIC 100 fetches the data for the packet of the transmit request. This operation may also include the use of an encryption key of peripheral bus 270. This peripheral bus encryption key would generally be different for the respective VEs (or group of VEs owned by a common tenant), thereby creating a secure channel over peripheral bus 270 for the VE (or group of VEs). Once the packet data has been retrieved, if peripheral bus encryption was applied to the packet data, then the peripheral bus decryption method is applied to the packet data. Next TE decryption is applied to the packet data. After these decryption operation(s), the offload operations that were indicated as part of the transmit request are executed. This can include checksum calculation and insertion, segmentation offload, encapsulation, and other offloads. This may additionally include encrypting the packet for one or more network encryption schemes (e.g., IPsec, MACsec, SSL, TLS, HTTPS). The packet is then ready for transmission and processed according to any packet pacing, bandwidth management, priority, or quality of service mechanisms in use by the NIC.

As data moves through a platform with TE technologies, it may be encrypted by various portions of the system by various keys. Specifically, VEs from different tenants generally have different keys. Additionally, in high security systems, different resources within a given VE would use different keys to provide further compartmentalization. This way if one shared resource is comprised, the other resources within the VE are not readily accessible. For example, a given VE may have one encryption key for memory level encryption, another for the peripheral bus, a third for a given accelerator, and yet another for storage.

A system may employ a near memory, far memory (e.g., network pooled memory) scheme. Near memory is generally on the same printed circuit board or motherboard as the processing unit and is accessed via a memory interface. In contrast, accessing far memory generally requires transactions over a network or fabric. Near memory, far memory is a two-tier example, but an arbitrary number of tiers are possible. Various tiers may employ different memory technologies with faster memory generally closer to the processing unit. When memory is partitioned in such a manner different keys, encryption schemes, or levels of security (e.g., key length) may be utilized for these different memory types (e.g., near memory may be encoded with a different encryption key than far memory).

When NIC 100 (or virtual NIC) is detected in a server, such as a hot-add or during boot, the operating system will generally query NIC 100 for its capabilities. These capabilities can include the number of virtual interfaces supported, number of queues, offload capabilities, and whether or not the NIC 100 can operate within a TE. If NIC 100 reports that can operate within a TE, authentication operations ensure that NIC 100 is authorized to be installed within the server. This can entail querying the NIC 100 credentials and comparing this with access lists. If NIC 100 is authenticated, then it is assigned to one or more TEs and the associated key(s) are issued to NIC 100.

When a TE is established, cores, memory, NIC(s) and other resources may be authenticated, provisioned, and assigned to the TE. The authentication may include use of an endorsement key and/or a public and private key pair. This may further involve the resource signing a randomly generated random number to demonstrate the capabilities required within the TE. Signing, in this context, can involve, for example, producing a hash with a private key that can be verified with the corresponding public key.

Microservices are scalable, independently deployable, modular services accessible via communication protocol. They are generally stateless, data centric, and/or aggregators. They are typically deployed via an orchestrator or hypervisor (e.g., Docker Swarm, Kubernetes (k8)). Microservices may be deployed in containers or other VEs. Serverless variants of microservices are possible. Microservices are generally employed by microservice architecture applications. Microservices can perform nearly any application function; example tasks include natural language processing, image recognition, inference, data transformations, database operations. A VE may contain (among other things) operating systems, applications, and/or microservices. In one example, orchestrator increases or decreases (e.g., scales up or down) the microservices operating in the one or more TEs associated with the NIC in response to network traffic associated with the NIC. This scaling can happen in response to traffic levels, congestion, queue depth, fail-over response, telemetry, or similar conditions.

Microservices running on shared resources for a VE could operate within a TE with dedicated key(s) to provide a layer of isolation from other VEs utilizing the same shared resources. These encryption operations, in some cases, would be stacked, such as when data that is encrypted with a memory encryption key is transported over a peripheral bus that uses encryption such as trust domain extensions for input output (TDX.IO).

A tenant may configure Device Personalization Policies (DDP) on the NIC 100 virtual functions (VF) and/or physical functions (PF). Via DDP, NIC 100 can present each VE with one or more VF or PF interfaces. This allows for IaaS or PaaS deployments. DDP can also be used to support edge multi-domain usages for CoSP.

Hardware root of trust may be employed such that cryptographic keys are assigned and protected by hardware mechanisms. Additionally, direct authentication may be used to verify credentials of devices and provide assurance that the devices joining the TE are capable of the reported cryptography and data privacy operations.

Cryptographic accelerators may be used for cryptographic mathematical operations, key generation, and/or malware scanning. In some embodiments, high entropy sources may be utilized in key generation.

Optional remote direct memory access (RDMA) features may be implemented to support RDMA operations. The RDMA operations may include conventional RDMA operations employing RDMA verbs and RDMA semantics, as well as virtual RDMA (vRDMA) operations implemented using extensions to RDMA verbs and RDMA semantics to support RDMA transfers in virtual environments. These RDMA operations may support iWARP and/or RDMA over Converged Ethernet (RoCE).

Generally, the functionality provided by embodiments of NIC 100 disclosed herein may be implemented via one or more forms. As used herein, including the claims, embedded logic comprises various forms of circuitry with or configured to implement logic including but not limited to processors, central processing units (CPU), microengines, microcontrollers, field programmable gate arrays (FPGA) and other programmable logic devices, application specific integrated circuits (ASIC), graphic processing units (GPU), data processing units (DPU), other processing units (XPU), and various forms of accelerators. The logic may be implemented by programming the physical hardware (e.g., for FPGAs and other programmable logic devices and ASICs) and/or via execution of instructions on one or more processing elements, such as a processor core, microengine, microcontroller, GPU, or accelerator. Hybrid devices may be implemented with more than one form of embedded logic, such as a NIC that includes a processing pipeline that is implemented via a combination of pre-programmed or dynamically programmed hardware circuitry and one or more processing elements on which firmware or embedded software are executed. Some or all of the NIC functionality may be included as part of a system-on-a-chip (SoC) or included in a chipset. NIC 100 can be used in network firewalls, access control, access lookup, authentication, tunneling, or cryptographic operations supporting link or tunnel protocols.

Various aspects of the embodiments herein may be facilitated by corresponding software and/or firmware components and applications, such as software and/or firmware executed by a processor or the like. Thus, embodiments may be used as or to support a software program, software modules, firmware, and/or distributed software executed upon some form of processor, processing core, or embedded logic a virtual environments running on a processor or core or otherwise implemented or realized upon or within a non-transitory computer-readable or machine-readable storage medium. A non-transitory computer-readable or machine-readable storage medium includes a mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, digital signal processors (DSP), FPGAs, etc.), embedded controllers, hardwired circuitry, hardware logic, etc. Software content (e.g., data, instructions, structures, configuration information, etc.) may be provided via an article of manufacture including non-transitory computer-readable or machine-readable storage medium, which provides content that represents instructions that can be executed. The content may result in a computer performing various functions/operations described herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

Example 1 include: a processor, comprising: circuitry to hardware-isolate virtual environments (VE) via cryptographic operations; and circuitry to generate one of more cryptographic keys for use by a network interface controller (NIC) to communicate with the hardware-isolated virtual environments VEs.

Example 2 includes one or more examples and includes circuitry for integrity protection of the one or more cryptography keys associated with a peripheral device.

Example 3 includes one or more examples and includes circuitry for a physical-address-metadata table (PAMT) used in page allocation, page initialization, and translation lookaside buffer (TLB) consistency including for memory pages allocated to a peripheral device input/output transaction.

Example 4 includes one or more examples and includes one or more non-transitory computer-readable media comprising a plurality of instructions stored thereon that, in response to being executed, cause a computing device to: detect a presence of a network interface controller (NIC), determine that the NIC has cryptographic capabilities that allow the NIC to operate within a trusted environment (TE), authenticating the cryptographic capabilities of the NIC, and assigning the NIC one or more cryptographic keys associated with one or more TEs.

Example 5 includes one or more examples and includes instructions to cause the computing device to: operate one or more virtual environments, one or more operating systems, one or more applications, one or more orchestrators, and/or one or more microservices in the one or more TEs associated with the NIC.

Example 6 includes one or more examples and includes instructions to cause the computing device to: increase a number of microservices operating in the one or more TEs associated with the NIC in response to network traffic associated with the NIC.

Example 7 includes one or more examples and includes instructions to cause the computing device to: discover a presence of one or more trusted environment (TE) instructions on a processor, and use, at least in part, the one or more TE instructions authenticate a network interface controller (NIC) for operation within a TE and to generate one or more associated cryptography keys.

What is claimed is:

1. A method, comprising:
for an ingressed network packet:
determining, at a network interface controller (NIC), a destination virtual environment (VE) for the network packet, wherein the NIC comprises a network interface, packet processing circuitry, and a direct memory access (DMA) circuitry and the destination VE comprises a trusted environment (TE),
determining, at the NIC, a peripheral bus encryption scheme of a peripheral bus connecting the NIC to a memory,
encrypting, at the NIC, the network packet in accordance with the determined peripheral bus encryption scheme,
encrypting, at the NIC, the network packet in accordance with an encryption scheme utilized in the TE, and
the NIC copying the encrypted network packet to a memory address associated with the TE.

2. The method of claim 1, further comprising:
at the NIC, detecting that the network packet has a form of network encryption that the NIC is configured to decrypt and
at the NIC, decrypting the packet from the network encryption prior to encrypting the network packet in accordance with the encryption scheme of the TE associated with the destination VE.

3. The method of claim 1, further comprising: at the NIC, using a direct data placement semantic to determine the memory address to write, at least a portion of, the network packet.

4. The method of claim 1, further comprising:
at the NIC, receiving a transmit request, the transmit request comprising control information;
at the NIC, determining the transmit request identifies one or more data buffers;
at the NIC, further determining one or more of the data buffers is within a TE;
at the NIC, reading the one or more data buffers, with one or more of the one or more data buffers being encrypted according to an employed TE scheme;
at the NIC, decrypting the one or data buffers that were encrypted according to the employed TE scheme; and
the NIC, constructing a second network packet and queueing the second network packet for transmission.

5. A network interface controller (NIC), comprising:
one or more network interfaces;
one or more peripheral bus interfaces; and
circuitry to perform Trusted Environment (TE) related cryptographic operations in association with a network packet, wherein to perform TE related cryptographic operations in association with the network packet comprises:
determine a destination TE for the network packet,
determine a peripheral bus encryption scheme of a peripheral bus connecting the NIC to a memory,
encrypt the network packet in accordance with the determined peripheral bus encryption scheme,
encrypt, at the NIC, the network packet in accordance with an encryption scheme associated with the destination TE, and
copy the encrypted network packet to a memory address associated with the destination TE.

6. The NIC of claim 5, wherein the cryptographic operation comprises an encryption operation applied to the network packet utilizing a cryptographic key associated with the destination TE.

7. The NIC of claim 5, wherein a Guest Physical Address (GPA) of a transfer operation includes an indication to allow or deny access to encrypted memory.

8. The NIC of claim 5, wherein the NIC comprises circuitry for remote attestation to provide indication to operate in the destination TE.

9. The NIC of claim 5, wherein the NIC comprises circuitry to decrypt the network packet utilizing a cryptographic key associated with the destination TE.

10. The NIC of claim 9, wherein the NIC comprises circuitry to encrypt a second network packet with a network cryptographic scheme prior to transmission of the second network packet.

11. A computing platform, comprising:
a processor, comprising virtualization circuitry and trusted environment (TE) circuitry;
a memory, coupled to the processor;
a network interface controller (NIC), coupled to the processor, including one or more network ports; and
the NIC, when in operation, is to perform a cryptographic operation associated with a TE on one or more network packets, wherein the perform the cryptographic operation comprises:
determine a destination TE for the network packet,
determine a peripheral bus encryption scheme of a peripheral bus connecting the NIC to a memory,
encrypt the network packet in accordance with the determined peripheral bus encryption scheme,
encrypt, at the NIC, the network packet in accordance with an encryption scheme utilized in the destination TE, and copy the encrypted network packet to a memory address associated with the destination TE.

12. The computing platform of claim 11, wherein the cryptographic operation performed on the one or more network packets comprises encrypt the one or more network packets utilizing a cryptographic key associated with the destination TE, prior to writing encrypted network packets to a region of the memory associated with the destination TE.

13. The computing platform of claim 11, wherein the cryptographic operation performed on the one or more network packets comprises decrypt the one or more network packets utilizing a cryptographic key associated with a second TE, prior to transmission of the one or more network packets via one or more transmit ports.

14. An apparatus comprising:
an interface and
a peripheral device coupled to the interface, wherein the peripheral device comprises one or more of: a network interface controller (NIC), field programmable gate array (FPGA), application specific integrated circuit (ASIC), graphic processing units (GPU), or processor and wherein the peripheral device comprises:
circuitry to:
determine a peripheral bus encryption scheme of a peripheral bus connecting the peripheral device to a memory,
encrypt a network packet in accordance with the determined peripheral bus encryption scheme,
determine a destination trusted environment (TE) for a network packet, wherein the TE is associated with a virtual environment (VE),
encrypt the network packet in accordance to an encryption scheme utilized in the destination TE, and
copy the encrypted network packet to a memory address associated with the destination TE.

15. The apparatus of claim 14, wherein the memory address has an associated indication to allow or deny access to encrypted memory.

* * * * *